J. KROHN.
DIFFERENTIAL GEAR.
APPLICATION FILED OCT. 7, 1918.

1,413,856.

Patented Apr. 25, 1922.

Inventor
John Krohn
Attorneys.

J. KROHN.
DIFFERENTIAL GEAR.
APPLICATION FILED OCT. 7, 1918.

1,413,856.

Patented Apr. 25, 1922.

Inventor,
John Krohn
Cummer & Cummer
Attorneys.

UNITED STATES PATENT OFFICE.

JOHN KROHN, OF CHICAGO, ILLINOIS.

DIFFERENTIAL GEAR.

1,413,856. Specification of Letters Patent. Patented Apr. 25, 1922.

Application filed October 7, 1918. Serial No. 257,230.

*To all whom it may concern:*

Be it known that I, JOHN KROHN, a citizen of the United States of America, and a resident of Chicago, county of Cook, and State of Illinois, have invented certain new and useful Improvements in Differential Gears, of which the following is a specification.

This invention relates to differential mechanisms suitable for such purposes as providing a drive connection between the wheels of vehicles while at required times permitting independently the necessary relative rotation between the wheels. The invention is a development of the differential gear construction described in applicant's copending application "differential gearings" filed November 15, 1917, Serial No. 202,126.

The purpose of the present invention in common with the device described in the earlier application is to provide a differential mechanism which in action fulfills the requirements for vehicle differentials and in construction has but few and durable parts.

An illustrative embodiment of the invention is shown in the accompanying drawings, in which—

Figure 1:
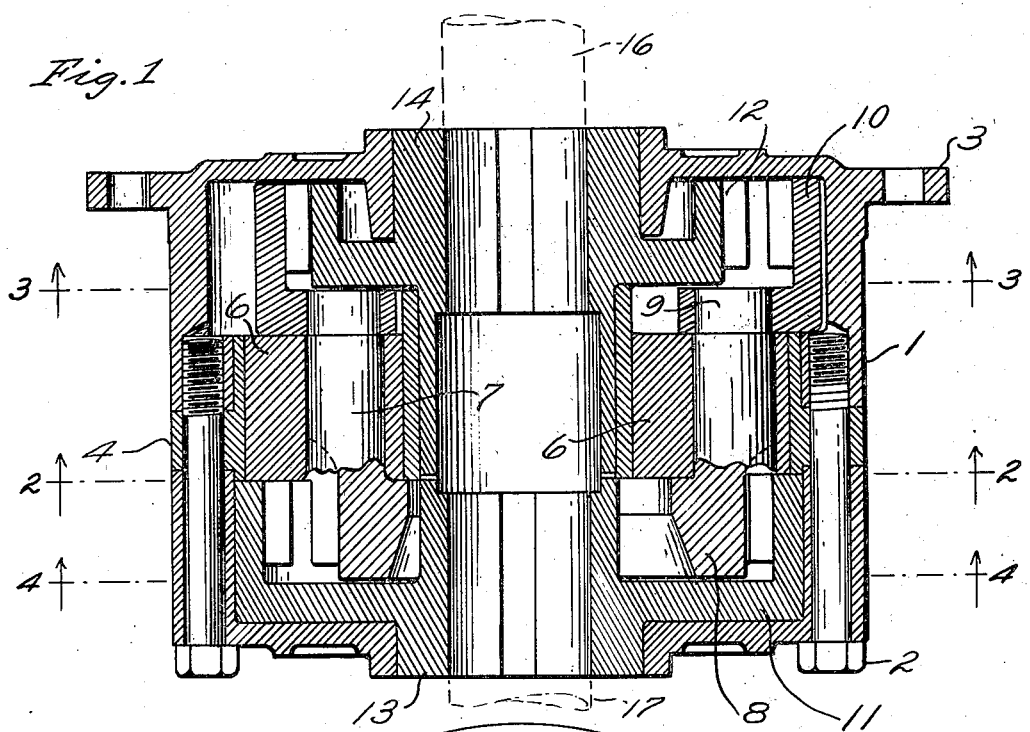
Fig. 1 is a central sectional plan of a differential mechanism constructed according to this invention.
Figure 2:
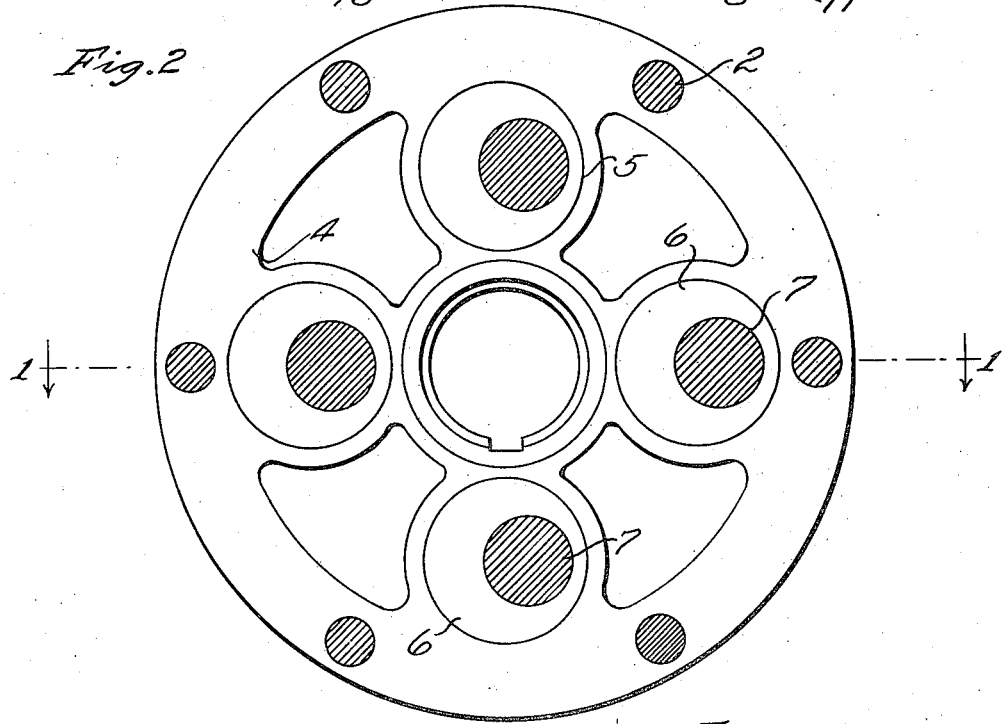
Fig. 2 is a view in vertical section taken on the line 2—2 of Fig. 1.
Figure 3:
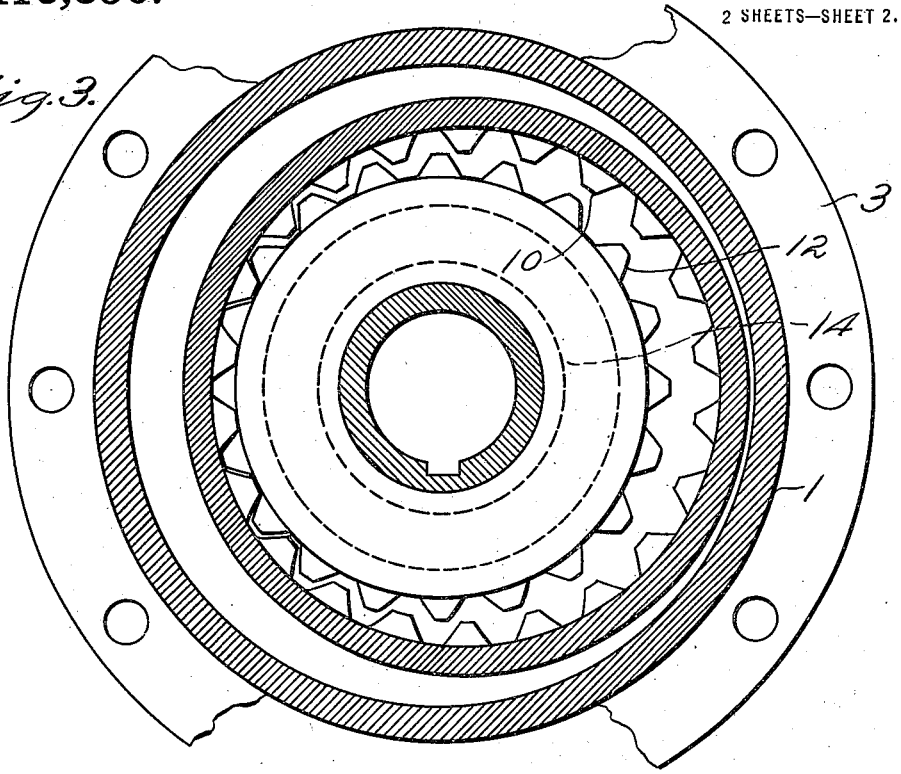
Fig. 3 is a vertical section taken on the line 3—3 of Fig. 1.
Figure 4:
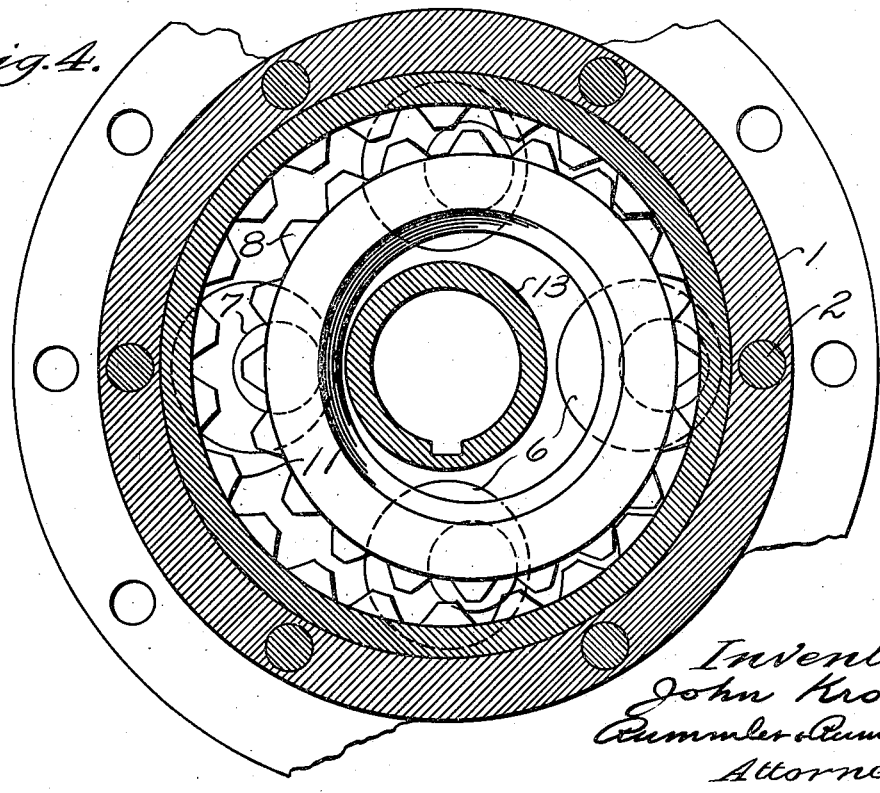
Fig. 4 is a vertical section taken on the line 4—4 of Fig. 1.

In its essentials the mechanism shown in the drawings comprises an internal and an external gear respectively fast on the adjacent ends of driven axle sections and meshing with an external and internal gear unit mounted to be capable of performing gyrational motions imparted to it both by the power shaft, for driving the axles at the same rate and in the same direction, and by the driven wheels, for communicating motion between the wheels in opposite directions.

The drawings show a housing or casing 1 of usual design for enclosing differential gearing, the two parts of the casing are clamped together by the threaded bolts 2, and one member of the casing is flanged for supporting the gear which receives motion from a power shaft and transmits it to casing 1. The bolts 2 pass through a central member 4 which with the casing constitutes a supporting frame and part of the drive for the differential gearing. The central drive member 4 is provided with a plurality of cylindrical journals 5 between its axis and periphery, for rotatably supporting disks 6, and each disk 6 has an eccentric aperture through which extends a stub shaft or trunnion 7 on the side of a gear 8. The ends 9 of the trunnions 7 projecting beyond the sides of the disks 6 provide supports for an internal gear 10. The trunnions 7 are located at equal distances from the center of gear 8 and, since they are supported by the eccentric apertures in the disks 6, serve to support the gears 8 and 10 in eccentric relation with the axis of the drive member 4. The gears 8 and 10 thus form a rigid unit which may swing around the centers of disks 6. The gears 8 and 10 respectively mesh with the internal and external gears 11 and 12 concentric with the axis of drive member 4 and fast to the driven axles 16 and 17. The hubs 13 and 14 of gears 11 and 12 provide journals for the casing 1.

In the operation of the device upon straight driving and as receiving motion from the gear on flange 3 of the housing 1, the member 4, the disks 6 journaled therein, and the stubs shafts 7 rotate as a unit. As these shafts carry gears 8 and 10, the latter will rotate with the housing and respectively drive the gears 11 and 12 at the same rate, provided the resistance to rotation offered by the shafts 16 and 17 does not greatly differ. Due to the arrangement of leverage in the mechanism the resistance to rotation of one only of shafts 16 or 17 might materially increase or decrease, but the differential mechanism responds to permit only a slight change in their rates relatively. The gear ratio in the design shown may be varied by slight changes in the diameter of one gear in each pair to make the device more or less responsive to changes in the load respectively carried by shafts 16 and 17.

When the vehicle makes a turn conditions are favorable to action of the differential mechanism. The inside wheel has a tendency to slow down and the outside wheel to speed up to compensate for the difference in the radii of the arcs described by the wheels. This retarding of one wheel and accelerating of the other is an action to which the differential mechanism is freely responsive. The gears 8 and 10 travel in orbits in the same direction around the centers of the disks 6. These disks are at such times rotated within their journals as urged by the circular motion of the stud shafts 7 when the gears 8 and 10 are respectively driven in eccentric paths in the same direction, due to rotation of gears 11 and 12 in opposite directions. The gears 11 and 12 being respectively internal and external, their opposite rotation will result in each urging the external gear 8 and the internal gear 10 to travel in a common orbit.

There is only a slight difference in pitch diameters between the pairs of external and internal gears, consequently for each complete relative rotation between the concentric gears 11 and 12, the eccentric gears 9 and 10 are caused to execute several orbital motions with the disks 6 as supporting centers. This ratio or the number of orbital motions which the eccentric gears are compelled to execute for each relative rotation between the concentric gears 11 and 12 determines mainly the amount of resistance to differential action afforded by the device when one of the driven vehicle wheels is suddenly relieved of its load. This resistance is increased by the fact that the oil within the casing must be displaced upon gyration of the eccentric gears.

With respect to any possible speed of a vehicle, the required differential action between its driven wheels is comparatively slight and slow. This requirement is met by the present differential mechanism in that it offers abnormal resistance to high speed differential action while it is easily responsive to slow speed differential action. Relative rotation of the axle sections and the gears thereon results in a comparatively rapid action of the gyratory driving gear unit which meshes with the gears on the axle sections. For each relative rotation between the driven axles, the driving gear unit is compelled to execute ten or eleven bodily circular motions.

Accordingly, the design is such that the mechanism may utilize to advantage the fact that friction of lubricated surfaces at low speeds and pressures is only substantially proportionate to the speed, while at moderate or high speeds the resistance increases, dependent in a measure upon the density and viscosity of the lubricant substantially as the square of the speed.

As an example, if one wheel of the vehicle is suddenly relieved of its load, or its load is suddenly increased, the differential mechanism will serve as a cushion, being responsive within limits to changes in loads respectively carried by two driven wheels.

Rapid differential action is greatly resisted due to the fact that the internal and external driving gear unit, located between the two driven axles, is at the times of differential action comparatively high speed mechanism. One relative turn between the two driven axles results in the internal and external driving gear unit executing eleven bodily circular motions with respect to the two driven gears and without turning on its axis. The small eccentrics, which support the driving unit, may turn in their bearings with comparative ease at low speed, but, particularly when lubricated by the more viscous oils, offer a high resistance at the high speeds which the eccentrics would be compelled to rotate if the differential rotation between the two driven axle sections much exceeded what is required in a vehicle differential.

According to the foregoing specification, it may be seen that in brief, the differential mechanism consists of a pair of gears one of which is fast on each of the driven axles and which respectively have internal and external teeth engaging external and internal eccentric gears connected together and, for the purpose of driving, receiving an orbital motion around the axis of the axles, but which are also capable of independently communicating reverse motion between the driven gears or wheels.

The invention is distinguishable from other known forms of differential gearings and irrespective of the particular design herein described, by the fact that between the driven axle sections or the gears thereon is a comparatively high speed mechanism which comes into action only when there is a differential or relative motion between the driven axles. The high speed mechanism having an extraordinarily large lubricated bearing area existing in the plurality of supporting eccentrics, encounters comparatively little resistance at these bearings when moving slowly. However, the resistance is cumulative on increasing speed of the differential action and is on the whole inversely proportional to the time in which the differential action takes place, and therefore rapid differential action is properly checked.

Although but one specific embodiment of this invention has been herein shown and described, it will be understood that numerous details of the construction shown may be altered or omitted without departing from the spirit of this invention as defined by the following claims.

I claim:

1. A differential mechanism comprising a rotatable frame, a pair of members having respectively internal and external toothed surfaces and an eccentric connection between said members permitting a unitary orbital motion with respect to said frame, a pair of driven members respectively having external and internal toothed surfaces and respectively in engagement with the internal and external teeth of said first-mentioned pair of members.

2. A differential mechanism comprising a drive member, an external and an internal gear on opposite sides of said drive member, eccentric connections between said gears, said eccentric connections being supported by said drive member, a pair of concentric driven gears respectively having internal and external toothed surfaces, and each respectively meshing with one of said first-mentioned gears.

3. A differential mechanism comprising a pair of separately driven concentric external and internal gears, eccentric internal and external gears respectively meshing with said concentric gears, a central support for said eccentric gears, a disk journaled in said support, said disk having an eccentric aperture and shaft connecting said eccentric gears and passing through said aperture.

4. A differential mechanism comprising a pair of coaxial internal and external gears, a driver for said gears comprising a unit having internal and external teeth for respectively meshing with said concentric internal and external gears, and a support for said driver arranged to permit the driver to execute both a bodily circular motion and an angular motion around the axis of said concentric internal and external gears.

5. A differential mechanism comprising a pair of coaxial axle sections, an internal gear on one of said axle sections, an external gear on the remaining axle section, an internal and external gear unit meshing with said first-mentioned gears, a support for said gear unit arranged to permit a bodily non-rotating circular motion of said gear unit, and means for rotating said gear unit.

6. In a differential mechanism, the combination with a plurality of driven members, of a driver connecting said driven members, said driver being constructed to permit differential action between said driven members and including means arranged to be actuated at increased speeds with respect to the differential action between the driven members by a differential motion between said driven members, said means comprising an eccentric having considerable bearing area.

7. A differential mechanism, comprising a driver, a plurality of driven members, a structure having driving connection with the respective driven members, eccentric means for supporting said structure relative to said driver whereby said structure is revolvable about the axis of said members, but non-rotatable about its own axis, for the purpose of transmitting motion in a reverse direction from one driven member to another.

8. A differential mechanism, comprising a driver, a plurality of driven members, a structure having driving connection with the respective driven members, eccentric means supporting said structure relative to said driver whereby said structure is revolvable about the axis of said members, but non-rotatable about its own axis, for the purpose of transmitting motion at substantially a one-to-one ratio in a reverse direction from one driven member to another.

9. A differential mechanism, comprising a driver, a plurality of driven members, a structure having driving connection with the respective driven members, eccentric means supporting said structure relative to said driver whereby said structure is non-rotatable about its own axis, but is revolvable at a relatively high speed about the axis of said members in response to differential action between said driven members.

10. A differential mechanism, comprising a driver, a plurality of driven members, a structure having driving connection with the respective driven members, eccentric means supporting said structure relative to said driver whereby said structure is non-rotatable about its own axis, but is revolvable at a relatively high speed about the axis of said members in response to differential action between said driven members, the arrangement of said eccentric means being such as will offer cumulative resistance to increases in speed of said structure caused by increase in the differential action of said members.

11. In a differential mechanism, the combination with a plurality of driven members, of a driver connecting said driven members, said driver being constructed to permit differential action between said driven members and including means arranged to be actuated at increased speeds with respect to the differential action between the driven members by a differential motion between said driven members, said means having a comparatively large bearing area for the purpose of offering cumulative resistance to differential action at increasing speeds.

12. In a differential mechanism, axle sections, means to check high speed differential motion between said axle sections, said means comprising slidably coacting elements having lubricated surfaces of large areas, said elements being arranged to be actuated by relative motion between the axle sections at high speed, as compared with the differential speed of the axle sections.

13. In a differential mechanism, a driver, a pair of driven members, eccentric gearing connecting said driven members and arranged to transmit reverse motion between said members and gyrate at comparatively high speed for such purpose, said eccentric gearing being mounted on an eccentric, said gearing and eccentric having slidably coacting lubricated surfaces of large area.

14. In a differential mechanism, a driver, a pair of driven members, eccentric gearing connecting said driven members and arranged to transmit reverse motion between said members and gyrate at comparatively high speed for such purpose, said eccentric gearing being mounted on a plurality of eccentrics, said gearing and eccentrics having slidably coacting lubricated surfaces of large area.

Signed at Chicago this 4th day of October, 1918.

JOHN KROHN.